S. P. HODGEN.
Sidewalk.
No. 233,348. Patented Oct. 19, 1880.
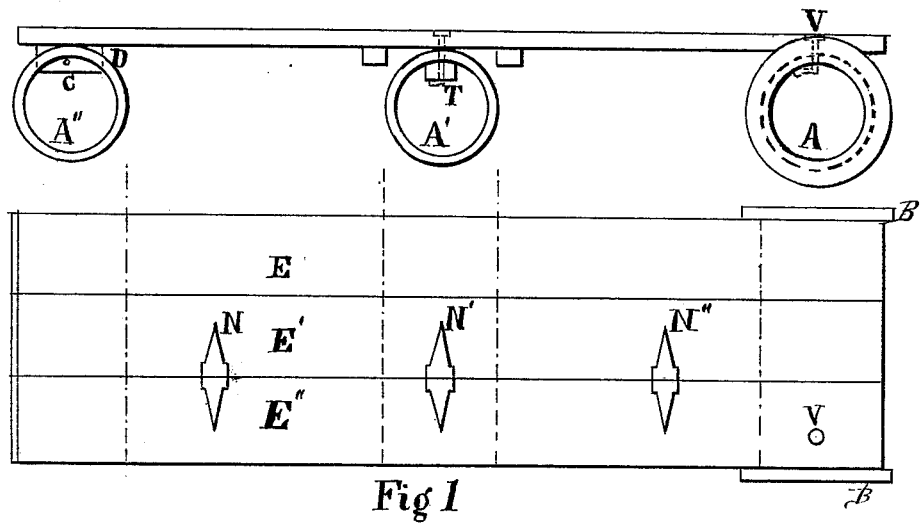
Fig 1
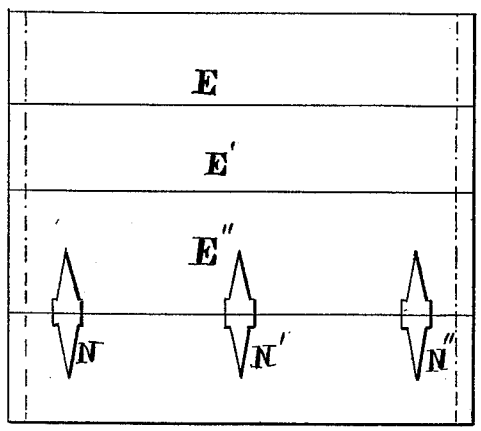
Fig. 2
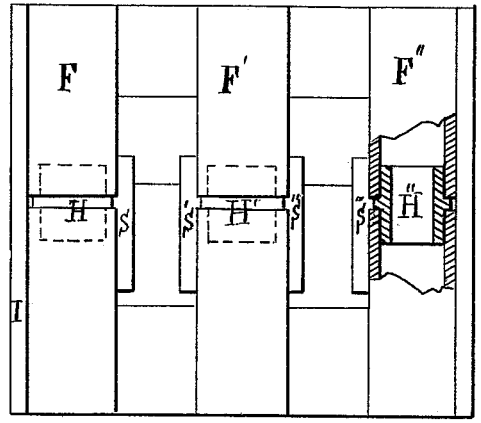
Fig. 3.
WITNESSES
Glenn Brown
G. A. Keehn
Samuel P. Hodgen
INVENTOR
by A. B. Jenkins
ATTORNEYS.

UNITED STATES PATENT OFFICE.

SAMUEL P. HODGEN, OF PITTSFIELD, ILLINOIS.

SIDEWALK.

SPECIFICATION forming part of Letters Patent No. 233,348, dated October 19, 1880.

Application filed January 14, 1880.

*To all whom it may concern:*

Be it known that I, SAMUEL P. HODGEN, of Pittsfield, in the county of Pike and State of Illinois, have invented a new and useful Improvement in the Construction of Sidewalks, which improvement is fully set forth in the following specification and accompanying drawings, in the construction of which, instead of using wooden joists or sleepers for the foundation, that speedily decay, I use for that purpose hollow cylindrical sleepers composed of clay molded and burned to hardness in the manner of converting that substance into tiles, my device being principally in the substitution of that character of foundation for the wooden one in common use.

In the drawings, Figure 1 represents a side, end, and top view of a section of sidewalk with said sleepers placed crosswise and the plank or board floor placed longitudinally upon them; and Fig. 2 represents a side, end, and top view of a section with said sleepers placed longitudinally, and the said floor placed thereon transversely.

In Fig. 1 three of said hollow sleepers are represented by letters A A' A''. They may be constructed with a flange or shoulder, B, at each end, as shown on sleeper A, to hold the plank or boards intact, or, as represented in sleeper A'', it may have apertures D (as many as desired) on the surface, made in molding or before burning, in which shall be inserted a cleat, C, that is first firmly secured to the bottom of the plank or boards constituting the floor. The principal object of this part of my device is to prevent the plank floor from slipping sidewise, but is also serviceable in securing the floor to the sleepers. Both objects can as well, and probably better, be accomplished by running through the hollow of each sleeper a section or strip of timber and driving nails through the floor, passing through holes in said sleepers prepared in molding or before burning, and into said strip of timber, said timber represented by letter T; or it may be accomplished by driving through the floor wrought nails, passing through holes in said sleepers, and made to clinch against them after passing through, as shown at letter V. Letters E E' E'' represent the plank or boards laid longitudinally upon said sleepers.

To construct a sidewalk according to this part of my device said sleepers are embedded slightly in the ground previously prepared for that purpose, or laid upon the surface thereof without any embedding, and the planks or boards laid thereon and fastened thereto, if the flanged or shouldered sleepers be used, by nails passing through holes in said flanges and into the outer edges of the planks constituting the floor, and further secured with the cleats C in apertures D, or by being nailed through the upper surfaces of said sleepers into the strips T, or by the wrought nails V, through the floor and upper surface of said sleepers and clinched thereto.

If the sidewalk should be constructed on sleepers with flanges B B' or the sleeper A'', with apertures D and cleats C, and the strips T, or wrought nails V should not be used, the planks constituting the floor may be secured together with a nail or spike having its head in the middle or center thereof, used at proper distances, one end driven into the edge of a plank and the other end into the edge of the adjoining plank, as shown by letters n n' n''. Should this plan be adopted it would be proper to construct each section of the floor as long as the planks used upon a separate platform or trestle used for that purpose, and after being completed laid upon the sleepers and secured thereto with the flanges B or cleats C in apertures D; and in constructing a sidewalk according to plan in Fig. 1 of the device, in whatever manner the floor may be secured to the sleepers, it would be better to construct each section the length of the planks used for the floor, having a sleeper very near each end of the section. As the planks will be more liable to decay at the ends than elsewhere, this will better facilitate the work of repairing, and the ends, projecting slightly beyond the sleepers and not resting directly thereon, will also be less liable to decay.

In Fig. 2 three sleepers, laid longitudinally, are shown by letters F F' F''.

Fig. 3 represents a bottom view of the same section, which shows three other sleepers, F F' F'', with their inner ends attached to the similar ends of their fellows, thus forming a continuous line of sleepers. At the junction of the ends of each pair of sleepers I use a short hollow cylinder, made of the same material and in the same manner of said sleepers, (or other substance, hollow or solid, may be used, the hollow tiling being preferred,) made a little less so that they will slip easily but closely fit into the orifices in the ends of said sleepers, the object being to hold said sleepers more securely in their positions. Said short cylinders, which I style "joints," are made of such length as will admit of their insertion into the sleepers sufficiently far to confine them to their places, and at the middle thereof is a slightly-raised shoulder to hold the short cylinders in position. The object of the shoulder being to confine the middle of the joint or short cylinder to the point where the two sleepers come together, can as well be accomplished by a nail or spike inserted in said joint equidistant from each end, the said joints shown by letters H H' H''.

Upon each side of the walk, and close to the sleepers, are placed upon their edges planks or strips I, the upper edges being horizontal with the upper surface of the sleepers, the principal object of said strips being to confine the outer sleepers to their places and supply something to which the ends of the planks constituting the floor shall be nailed.

The planks composing the floor of the walk are represented, as in Fig. 1, by letters E E' E''.

In constructing a sidewalk according to plan shown by Figs. 2 and 3, the sleepers are placed upon the ground, as explained in Fig. 1, except that they are placed longitudinally. The planks are placed upon them transversely, the ends securely nailed to the upper edges of planks or strips I. The better to secure said planks together and avoid warping, I use nails or spikes with heads in the middle (letters $n$ $n'$ $n''$) in the same manner as described in Fig. 1; and to assist in accomplishing the same purpose I nail transversely to the bottom of each plank of the floor small strips of wood, S S' S'' S''', which may be as long, or nearly so, as each plank is wide, each extending from near the middle of the plank to the edge and beyond the edge the same distance, so that when the floor is laid one part will be under one and the other part under the adjoining plank. The parts of said strips nailed to the bottom of one plank for convenience may be so nailed before the plank is laid upon the sleepers, and if it is desired to nail the other ends of strips to said planks it may be done by driving the nails after the plank has been laid upon the sleepers, placing for that purpose some hard substance of proper height under each strip at the time of nailing. I will at my option use the nails $n$ $n'$ $n''$ or the strips S S' S'' S''', and not the other, or both, in the construction of a sidewalk.

I am aware that hollow cylindrical sleepers for sidewalks are old, and such I do not wish to be understood as claiming, broadly, as of my invention; but

What I claim as new, and desire to secure by Letters Patent, is—

1. In a sidewalk, the combination of the hollow cylindrical earthen sleepers provided with end flanges, B B, and planks laid transversely across said sleepers, substantially in the manner herein shown and described.

2. In a sidewalk, the combination, with hollow cylindrical earthen sleepers, of cylindrical earthen joints H, having raised shoulders adapted to fit between the connecting ends of said sleepers, substantially as herein shown and described.

SAMUEL P. HODGEN.

Witnesses:
WM. B. JONES,
CHAS. H. CURTIS.